(12) United States Patent
Thanos et al.

(10) Patent No.: US 8,655,463 B2
(45) Date of Patent: *Feb. 18, 2014

(54) METHOD FOR AVOIDING REFRESHING A DATABASE OF METADATA ASSOCIATED WITH DIGITAL MEDIA CONTENT

(75) Inventors: William Thanos, Scotts Valley, CA (US); Hyuk-Il Kwon, Seoul (KR); In-Soo Yoon, Seoul (KR); Joseph R. Meza, Aliso Viejo, CA (US); David Jeppson, Livermore, CA (US)

(73) Assignee: SanDisk Technologies Inc., Plano, TX (US)

( * ) Notice: Subject to any disclaimer, the term of this patent is extended or adjusted under 35 U.S.C. 154(b) by 1269 days.

This patent is subject to a terminal disclaimer.

(21) Appl. No.: 11/804,994

(22) Filed: May 18, 2007

(65) Prior Publication Data

US 2008/0288098 A1 Nov. 20, 2008

(51) Int. Cl.
*G06F 17/00* (2006.01)

(52) U.S. Cl.
USPC .......................................................... 700/94

(58) Field of Classification Search
USPC ..................................... 700/94; 710/104, 301
See application file for complete search history.

(56) References Cited

U.S. PATENT DOCUMENTS

| | | | |
|---|---|---|---|
| 6,601,140 B1* | 7/2003 | Okaue et al. | 711/115 |
| 2003/0223012 A1 | 12/2003 | Fujisawa | |
| 2005/0066207 A1* | 3/2005 | Fleck et al. | 713/320 |
| 2006/0206544 A1* | 9/2006 | Oks et al. | 707/204 |
| 2007/0094611 A1 | 4/2007 | Sasaki | |
| 2007/0100893 A1* | 5/2007 | Sanders | 707/200 |
| 2007/0204089 A1* | 8/2007 | Proctor | 710/301 |
| 2007/0229518 A1* | 10/2007 | Kii et al. | 345/520 |

FOREIGN PATENT DOCUMENTS

| | | |
|---|---|---|
| CN | 1955908 A | 5/2007 |
| GB | 2 431 750 | 5/2007 |

OTHER PUBLICATIONS

"SanDisk™ c200 Series MP3 Players," http://www.sandisk.com/Products/Catalog(1199)-SanDisk_Sansa_c200_Series_MP3_Play..., 2 pages, printed May 29, 2007.

SanDisk Sansa™ Express® MP3 Player," http://www.sandisk.com/Products/Item(2291)-SDMX6R-1024K-Sansa_Express_MP3_Pla...", 2 pages, printed May 29, 2007.

Vygi, "My 9-GB Sansa e280," www.anythingbutipod.com/forum/showthread.php?t=5580, 15 pages, Dec. 19, 2006.

(Continued)

*Primary Examiner* — Andrew C Flanders
(74) *Attorney, Agent, or Firm* — Brinks Gilson & Lione

(57) ABSTRACT

A method for avoiding refreshing a database of metadata associated with digital media content is disclosed. In one embodiment, a digital media player storing a database of metadata associated with digital media content determines whether a removable memory device was connected with the digital media player while the digital media player was powered down. The digital media player refreshes the database only if it is determined that the removable memory device was connected with the digital media player while the digital media player was powered down. In another embodiment, the digital media player determines whether the digital media content stored on the removable memory device changed since the database was last updated. The digital media player refreshes the database if it is determined that the digital media content stored on the removable memory device changed since the database was last updated.

6 Claims, 5 Drawing Sheets

(56) References Cited

OTHER PUBLICATIONS

Invitation to Pay Additional Fees and Partial Search Report for PCT/US2008/005055, 6 pages, Sep. 25, 2008.
Written Opinion and Search Report for PCT/US2008/005055, 16 pages, Oct. 12, 2008.
Office Action for U.S. Appl. No. 11/804,580, dated Feb. 16, 2011, 6 pages.
Office Action for U.S. Appl. No. 11/804,579, dated Aug. 20, 2010, 11 pages.
Office Action for U.S. Appl. No. 11/804,580, dated Aug. 18, 2010, 12 pages.
Office Action for U.S. Appl. No. 11/804,995, dated Jul. 26, 2010, 12 pages.
Office Action for Taiwanese Application No. 097116020, dated Jul. 18, 2012, 8 pages.
Office Action for U.S. Appl. No. 11/804,580, dated May 6, 2011, 12 pages.
Office Action for U.S. Appl. No. 11/804,580, dated Oct. 18, 2011, 13 pages.
Office Action for European Patent Application Serial No. 07 743 084.9, dated Dec. 5, 2011, 7 pages.
Office Action for U.S. Appl. No. 11/804,580, dated Apr. 23, 2012, 14 pages.
Office Action for Chinese Patent Application Serial No. 200880023737.8, dated Apr. 5, 2012, 16 pages.
First Office Action for Chinese Patent Application Serial No. 2008800237378, dated Jun. 24, 2011, 6 pages.

* cited by examiner

METHOD FOR AVOIDING REFRESHING A DATABASE OF METADATA ASSOCIATED WITH DIGITAL MEDIA CONTENT

CROSS-REFERENCE TO RELATED APPLICATION

This application is related to "Digital Media Player with Circuitry for Avoiding Refreshing a Database of Metadata Associated with Digital Media Content," U.S. patent application Ser. No. 11/804,579, "Method for Improving a Digital Media Player Experience," U.S. patent application Ser. No. 11/804,580, and "Digital Media Player with Improved User Experience," U.S. patent application Ser. No. 11/804,995, each of which is being filed herewith and is hereby incorporated by reference.

BACKGROUND

Some digital media players have a slot to receive a removable memory card, which provides a digital media player with additional memory to store digital media content. In addition to providing a digital media player with more memory, removable memory cards can be used to organize and store different types of digital media content. For example, a user can store songs of a certain genre on one removable memory card and store songs of a different genre on another removable memory card. In this way, the user can simply swap memory cards in the digital media player to listen to different types of song genres. When a digital media player is powered-up with a memory card inserted in its memory card slot, the digital media player may not know what digital media content is stored on the memory card. Accordingly, at power-up, the digital media player scans the memory card and creates a database of metadata associated with the digital media content stored on the memory card. This process of scanning and creating a database can be relatively time consuming. For example, the digital media player may require more than two minutes to scan and create a database of a full two-gigabyte memory card. The database is refreshed every time the digital media player is powered-up with a memory card inserted in the player—even if no changes have been made to the memory card that would require the database to be refreshed. Since a user needs to wait for the database to be refreshed before being able to play digital media content with the digital media player, a user may become frustrated and decide to use the digital media player without the memory card in order to avoid the delay.

SUMMARY

The present invention is defined by the claims, and nothing in this section should be taken as a limitation on those claims.

By way of introduction, the embodiments described below provide a method for avoiding refreshing a database of metadata associated with digital media content. In one embodiment, a digital media player storing a database of metadata associated with digital media content determines whether a removable memory device was connected with the digital media player while the digital media player was powered down. The digital media player refreshes the database only if it is determined that the removable memory device was connected with the digital media player while the digital media player was powered down. In another embodiment, the digital media player determines whether the digital media content stored on the removable memory device changed since the database was last updated. The digital media player refreshes the database if it is determined that the digital media content stored on the removable memory device changed since the database was last updated. Other embodiments are disclosed, and each of the embodiments can be used alone or together in combination.

The embodiments will now be described with reference to the attached drawings.

DETAILED DESCRIPTION OF THE PRESENTLY PREFERRED EMBODIMENTS

Figure 1:
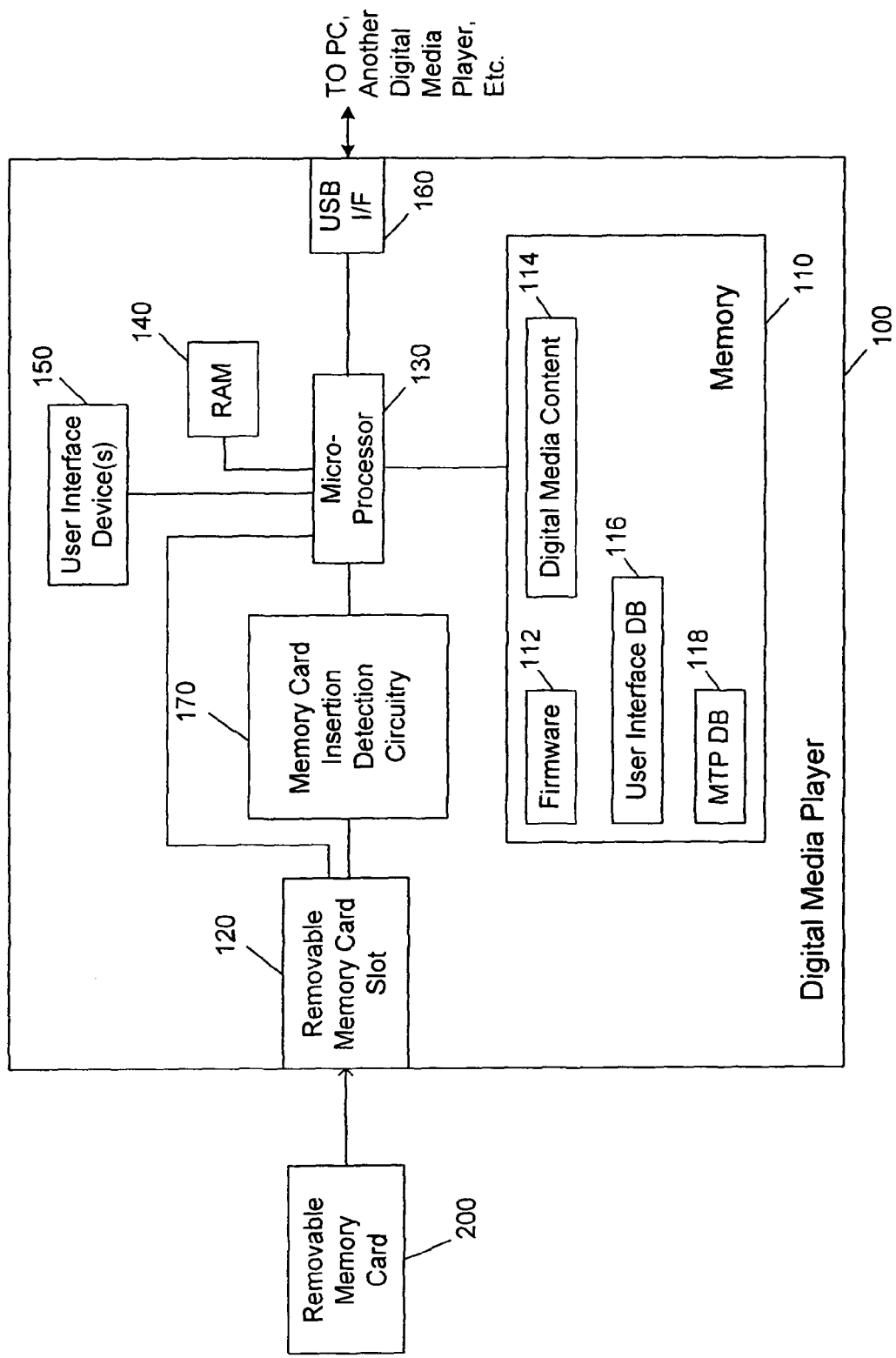
FIG. 1 is an illustration of a digital media player of an embodiment.

Turning now to the drawings, FIG. 1 is an illustration of a digital media player 100 of an embodiment. The digital media player 100 can take any form, such as, but not limited to, a portable audio player (e.g., an MP3 player), a portable video player, a cell phone, a car stereo, etc. Although the term "player" is used, it should be understood that, in addition to playing digital media content, the digital media player can be able to record digital media content (from an internal or external source). Digital media content can take any suitable form, such as, but not limited to, an audio file or a video file (with or without audio).

As shown in FIG. 1, the digital media player 100 of this embodiment comprises a memory 110 as well as a slot 120 configured to receive a removable memory device (e.g., with a mating electrical connector). A removable memory device can take any suitable form, such as a memory card (e.g., an SD card) or stick. In these embodiments, the removable memory device will take the form of a removable memory card 200. It should be noted that various terms will be used herein to describe a removable memory device being placed in communication with the digital media player 100 (e.g., inserting the removable memory device into the player 100, connecting the removable memory device with the player 100, etc.) It should be clear that no particular mechanism is required, and none should be read into the claims. Further, a removable memory device can be placed in communication with the digital media player 100 directly or indirectly through one or more components, which may or may not be shown or described herein. The memory 110 in the digital media player 100 can also take any form (solid state, magnetic, optical, etc.), although it is preferred that the memory 110 be non-volatile memory (e.g., flash memory). It should also be noted that the memory 110 internal to the digital media player 100 can be removable, like the removable memory card 200.

As also shown in FIG. 1, the digital media player 100 comprises several components: a microprocessor 130, RAM 140 (e.g., SRAM), user interface device(s) 150, a universal serial bus (USB) interface 160, and memory card insertion detection circuitry 160. Other components of the digital media player 100 are not shown in FIG. 1 to simplify the drawing and can include, for example, components to allow wireless transmission of digital media files and other data between the digital media player 100 and other devices. It should be noted that while the components in FIG. 1 are shown as separate from one another, one or more of these components can be combined. For example, while the microprocessor 130 and RAM 140 are shown as two separate components in FIG. 1, the microprocessor 130 and RAM 140 can be part of the same die or package.

In this embodiment, the operation of the digital media player 100 is generally controlled by the microprocessor 130 executing computer-readable program code stored as firmware 112 in the memory 110. It should be noted that while a microprocessor 130 is shown in FIG. 1, different forms of circuitry can be used to perform some or all of the functions described herein (as well as other functions). "Circuitry" can include one or more components and be a pure hardware implementation and/or a combined hardware/software (or firmware) implementation. Accordingly, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. It should be noted that "circuitry" recited in the claims may or may not include memory card insertion detection circuitry 170, which is described below. Further, memory card insertion detection circuitry 170 may or may not include a microprocessor.

In operation, the digital media player 100 uses its user interface device(s) 150 to allow a user to select and play digital media content stored in the memory 110 or in the removable memory card 200. The user interface device(s) 150 can include, for example, a display device to display a list of available digital media files and related information (e.g., album art), a scroll wheel or arrow key to allow a user to select a digital media file, and a headphone jack or speaker to provide audio output of the selected digital media file. If the selected digital media file contains video, the video can be displayed on the display device.

In general, the digital media player 100 can store one or more databases with information about the digital media files stored in the memory 110 and/or the removable memory card 200. These database(s) can be used by the digital media player 100 in the process of selecting and playing digital media content. In some situations, these database(s) can be used by a host (e.g., a PC, another digital media player, etc.) connected to the digital media player 100 via the USB interface 160 or other component not shown in FIG. 1 (e.g., a wireless transmitter). While any number and type of database can be used, in this particular embodiment, two databases are used: a user interface database 116 and a media transfer protocol (MTP) database 118, both of which are stored in the memory 110 in this embodiment (although the databases 116, 118 can be stored in different memories, if desired). It should be noted that the number and type of databases uses in this embodiment should not be read into the claims unless explicitly recited there.

The user interface database 116 and the MTP database 118 both store metadata associated with digital media content stored in the memory 110 and/or removable memory card 200. Metadata refers to information about digital media content. Examples of metadata can include, but are not limited to, information that allows a user to make a selection of the digital media content for playback (e.g., song name, album name, artist name, etc.), information that allows the digital media player 100 to know how to decode and play the digital media content (e.g., bit rate, encode method (e.g., MP3 or WMA), order of songs on an album to properly sequence playback of songs, etc.), and associated information about the digital media content (e.g., album art, duration of a song/album, etc.). Metadata can be stored in the file of the digital media content itself (e.g., in a header block of the file) or can be stored in a separate location (e.g., a jpeg image of album art can be stored separately from the digital media content file). Although some forms of metadata can be the same as information from a file system (e.g., the title of a song can be the same as the actual file name), in general, metadata is usually information other than what is typically gleaned from file system information (e.g., file name and file size).

The digital media player 100 in this embodiment can be operated in either MTP mode or mass storage class (MSC) mode, in which the digital media player 100 acts as a normal disk drive. MTP is a protocol specified by Microsoft and is used primarily in conjunction with digital rights management (DRM). Digital media content protected by DRM is typically encrypted and requires a license, which can be stored on the digital media player 100. When the digital media files are stored in the digital media player 100 in MTP mode, the microprocessor 130, using an MTP stack, stores the digital media content in one file and the associated license in another file in the memory 110 according to MTP protocols. In this embodiment, licenses to play digital media content are stored in the memory 110 of the digital media player 100. Accordingly, protected digital media content stored on the removable memory card 200 can only be played using the digital media player 100 (and not using a different digital media player 100 since it would not have the required license). (In an alternative embodiment, both the protected digital media content and the associated license is stored on the removable memory card 200 to make the content portable and playable in any suitable device.) When the digital media player 100 is connected to a host device, the digital media player 100 negotiates USB contact with the host device and sends a file containing the MTP database 118 to the host device. From the metadata in this database 118, the host device will be able to display a representation of the digital media content stored in the memory 110 and/or removable memory card 200 of the digital media player 100. Since the host device's knowledge of the digital media content stored in the memory 110 or the card 200 comes from the MTP database 118, it is preferred that the MTP database 118 be kept up-to-date. Otherwise, digital media content added to the memory 110 or card 200 after the MTP database is created will not be visible to the host device.

The user interface database 116 also contains metadata associated with the digital media content stored in the memory 110 and the removable memory card 200. While the MTP database 118 was used to allow a host device to view digital media content stored in the digital medial player 100 in MTP mode, in this embodiment, the user interface database 116 is used by the digital media player 100 to access and play MTP- and non-MTP-stored digital media content. For example, the digital media player 100 can use the metadata in the user interface database 116 to display song titles, artists, etc. on its display screen for selection by the user and then use the metadata to know how to decode and play a selected song.

While the user interface database 116 can be identical to the MTP database 118, in this embodiment, the user interface database 16 is a subset of the MTP database 18, as the digital media player 100 does not need all of the metadata stored in the MTP database 18 to perform its operations. As such, the user interface database 16 can be built from a subset of the metadata stored in the MTP database 118, or it can be built separately from the MTP database 118. The user interface database 116 can also contain information not stored in the MTP database 18. In one presently preferred embodiment, the user interface database 116 is copied from the memory 110 and temporarily stored in RAM 140, which is preferably smaller (e.g., 320K) than the memory 100 and also can allow faster access to the user interface database. If any changes are made to the user interface database while it is stored in RAM 140, the changes can be updated to the user interface database 116 stored in the memory 110.

As with the MTP database 118, it is preferred to keep the user interface database 116 up-to-date; otherwise, digital media content added to the memory 110 or card 200 after the user interface database is created will not be accessible by digital media player. There are certain actions that can trigger a refresh of the user interface and MTP databases 116, 118. For example, if the memory card 200 is removed and reinserted into the digital media player 100, it is possible that, when the card 200 was outside of the player 100, the card 200 was inserted into a host device or another digital media player that modified (e.g., added, removed, renamed, etc.) the digital media content stored in the card 200. In such a situation, the user interface and MTP databases 116, 118 would not accurately represent the current state of the card 200.

In order to keep the user interface database 116 up-to-date, the microprocessor 130 can cause a refresh of the user interface database 116 under certain conditions. Before turning to some examples, it should be noted that both the user interface database 116 and the MTP database 18 can be refreshed. However, as the digital media player 100 in this embodiment only uses the user interface database 116 and not the MTP database 118 to access digital media content when operating on its own, only the user interface database 116 will be refreshed by the digital media player 100 in this embodiment. (The MTP database 118 can be refreshed by a host device that is later connected to the player 100.) However, it should be noted that both the user interface database 116 and the MTP database 118 (or just the MTP database 118) can be refreshed. Accordingly, which and how many databases are refreshed should not be read into the claims unless explicitly recited therein.

As mentioned above, there are several situations under which the user interface database 116 may no longer be up-to-date. One such situation is when the digital media player 100 is connected to a host device that has the capability of modifying the digital media content stored in the memory 110 and/or card 200. If a host device adds, deletes, renames, etc. any of the digital media content stored in the player 100, the user interface database 116 would no longer accurately represent the digital media content stored in the player 100. To ensure that the user interface database 116 will be up-to-date, the player 100 can be designed such that the detection of a connection to a host device that is capable of modifying digital media content will trigger a refresh of the user interface database 116. The connection can be detected, for example, by detecting a power interrupt from the USB interface 160 or determining that the player 100 fully negotiated a USB protocol over the USB interface 160.

Another situation is when the memory card 200 is removed and reconnected with the player 100. While the memory card 200 was outside of the player 100, it is possible that the memory card 200 was connected to a host device or another digital media player that modified the digital media content stored on the card 200. Additionally, the memory card reinserted into the player 100 can be a different card with digital media content that is not specified in the user interface database 116. Accordingly, if, while the digital media player 100 is powered up, the digital media player 100 detects that a memory card is inserted into the card slot 120 (e.g., by the microprocessor 130 monitored a pin-out of the card slot 120), the digital media player 100 can perform a refresh of the user interface database 116. It should be noted that the player 100 can refresh the entire user interface database 116 (including entries for the digital media content 114 stored in the memory 110, even thought card insertion would not compromise these entries), or the player 100 can refresh only the entries in the user interface database 116 that are associated with digital media content stored on the card 200 (as indicated by a flag, for example, in the user interface database 116).

If the digital media player 100 is powered-down, the microprocessor 130 will not be powered-up and, accordingly, will not be able to monitor the pin-out of the card slot 120 to determine if a memory card was inserted while the player 100 was powered-down. Accordingly, as a precaution to avoid a compromised database, the digital media player 100 can be designed to refresh the user interface database 116 every time the digital media player 100 is powered up with a memory card inserted in the card slot 120. Since a refresh always occurs on power-up, the possibility of an out-of-date user interface database 116 is avoided. However, as described in the background section above, the process of refreshing the user interface database 116 can be relatively time consuming. For example, the digital media player 100 may require more than two minutes to refresh the database 118 for a full two-gigabyte memory card. Since this delay would be encountered every time the player 100 is powered-up—even if the memory card 200 was not removed from the slot 120 when the player 100 was powered-down—a user may become frustrated and decide to not to use the removable memory card 200 with the digital media player 100 to avoid this delay.

To avoiding an unneeded refresh of the user interface database, in this embodiment, the digital media player 100 comprises memory card insertion detection circuitry 170, which detects when a removable memory card is inserted in the digital media player 100. The memory card insertion detection circuitry 170 is preferably powered by a battery that provides power even when the digital media player 100 is powered-down, so the circuitry 170 can detect the insertion of a memory card even when the digital media player 100 is powered-down. When the digital media player 100 is powered-up with a memory card inserted in the card slot 120, instead of automatically refreshing the user interface database 116, the digital media player 100 checks the memory card insertion detection circuitry 170 to determine whether or not a removable memory card was inserted while the digital media player 100 was powered-down. The user-interface database 116 is refreshed only if it is determined that a memory card was inserted in the digital media player 100 while the digital media player 100 was powered down; otherwise, the refresh operation is avoided.

Figure 2:
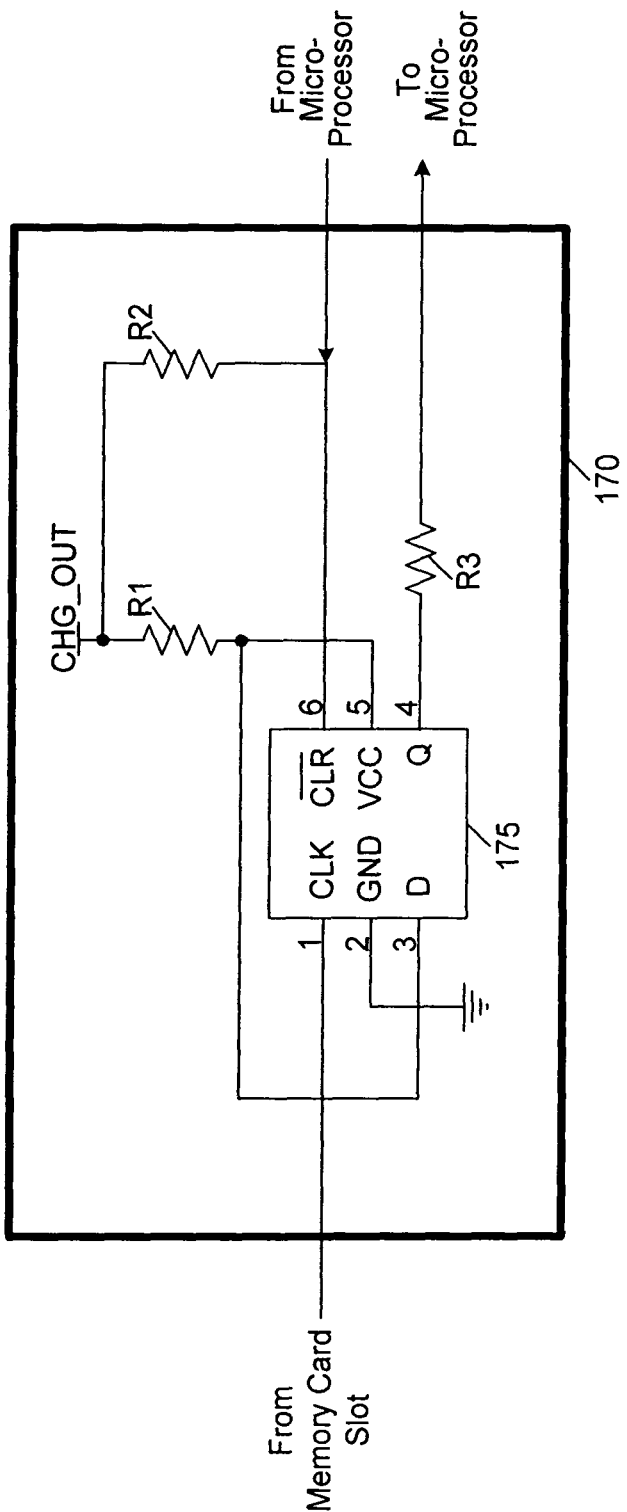
FIG. 2 is an illustration of memory card insertion detection circuitry of an embodiment.

FIG. 2 is an illustration of memory card insertion detection circuitry 170 of an embodiment. It should be noted that the implementation shown in FIG. 2 is merely an example and that the memory card insertion detection circuitry 170 can take other forms. Accordingly, the components shown in FIG. 2 should not be read into the claims unless explicitly recited therein. As shown in FIG. 2, in this embodiment, the memory card insertion detection circuitry 170 comprises a D flip flop 175 and a plurality of resistors R1, R2, R3. In one implementation, the flip flop 175 takes the form of an 74 175 flip flop (part no. SN74LVC1G175DCKR PbF) and is part of an integrated circuit, and the resistors R1, R2, and R3 are R0402 resistors with the following respective resistances (with a 5% tolerance): 100 ohms, 47 kilo-ohms, and 10 kilo-ohms. Of course, other values and designs can be used. For example, instead of a D flip flop, another type of latch can be used.

In this embodiment, the flip flop 175 is powered by a battery (not shown, but providing the CHG_OUT signal shown in FIG. 2), so that the flip flop 175 can operate even when the digital media player 100 is powered down. The input to the clock of the flip flop 175 is connected to the memory card slot 120. When a memory card is inserted into the slot 120, the slot 120 provides a signal to the clock input, causing the clock to go from low to high. Removing the card from the slot 120 causes the clock to go from high to low. The D input of the flip flop 175 is connected to the battery that provides a signal (CHG_OUT) to the D input even when the digital media player 100 is powered down. Since the D input is always in the high state, Q will be high when a memory card is inserted in the slot 120 (because card insertion causes the clock to go from low to high). The Q output is provided to the microprocessor 130. Subsequently removing the card from the slot 120 does not affect the value of Q in this embodiment, as the change in the clock does not reset the flip flop 170, and the constant signal from the battery is connected to an inverted clear input on the flip flop 170. However, the flip flop 175 can be reset from a signal from the microprocessor 130.

Figure 3:
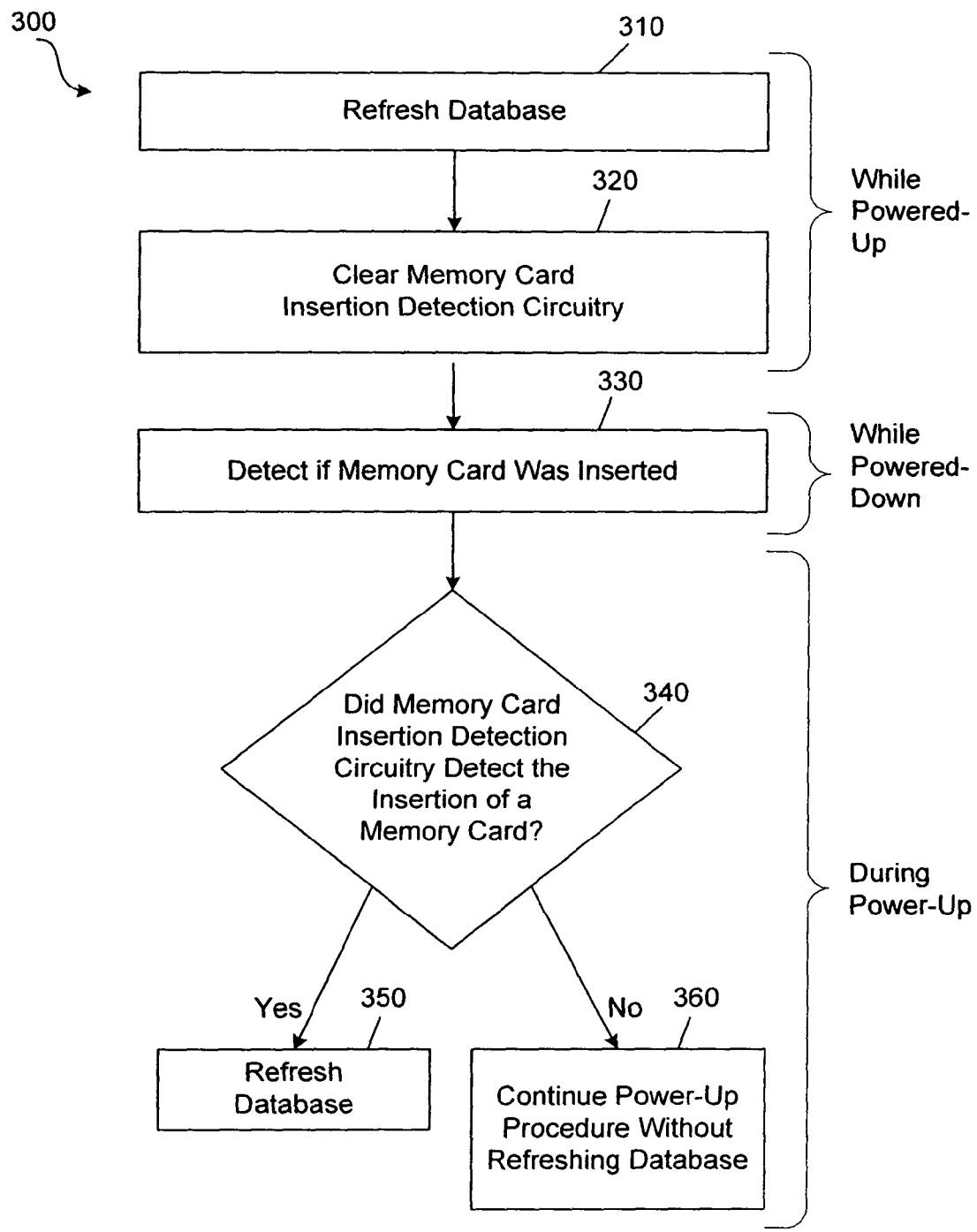
FIG. 3 is a flow chart illustrating the operation of memory card insertion detection circuitry of an embodiment.

FIG. 3 is a flow chart 300 that illustrates the operation of the memory card insertion detection circuitry 170. As shown in FIG. 3, while the digital media player 100 is powered-up, the microprocessor 130 refreshes the user interface database 116 (act 310). As discussed above, various situations may trigger the refresh, including, but not limited to, the microprocessor 130 detecting a change in an insert signal from the memory card slot 120 (e.g., that a memory card was removed and, subsequently, that a memory card was inserted) or the microprocessor 130 detecting that the digital media player was connected to a host device capable of modifying digital media content stored on an inserted memory card. The user interface database 116 can be refreshed in any suitable way. For example, the entire database 116 (including entries from the internal memory 110) can be erased and rebuilt from scratch. Alternatively, only those entries identified as belonging to the card (but not to the internal memory 110) can be erased and rebuilt from scratch. As another alternative, instead of erasing database entries and rebuilding the database, entries can be kept in the database and verified during the refresh process, with out-of-date entries being removed or modified. After the user interface database 116 has been refreshed, the microprocessor 130 clears the memory card insertion detection circuitry 170 (act 320). In this embodiment, the microprocessor 130 performs this act by asserting the appropriate signal to clear the flip-flop. Clearing the flip flop 175 means that the Q output will be low.

As mentioned above, power is provided to the memory card insertion detection circuitry 170 even when the digital media player 100 is powered-down. Accordingly, the memory card insertion detection circuitry 170 can detect if a memory card is inserted into the memory card slot 120 while the digital media player 100 is powered-down (act 330). Specifically, when a memory card is removed from the slot 120 and the same or different memory card is inserted into the slot 120, the insertion of the card causes the clock signal to go from low to high, which causes the Q output to also go from low to high. (Because the memory card slot 120 is not connected to the clear input of the flip flop 175, subsequent removal of memory card will not cause the Q output to go from high to low.)

When the digital media player 100 is later powered-up, the microprocessor 130 goes through a power-up (or boot-up) routine, one part of which is determining whether the memory card detection circuitry 170 detected an insertion of a memory card into the slot 120 while the player 100 was powered down (act 340). If the memory card detection circuitry 170 detected an insertion of a memory card into the slot 120 while the player 100 was powered down (e.g., the Q output is high instead of low) and if the microprocessor 130 detects that there is a card currently in the card slot 120 (if no card is in the card slot 120, a database refresh may not be necessary if the database includes a field to designate "external" digital media content), the microprocessor 130 would know that the card present in the slot 120 may not contain the same digital media content as when the user interface database 116 was last refreshed (i.e., when the Q output was last reset to zero). Accordingly, the user interface database 116 may not be accurate, and the microprocessor 130 would read the digital media content on the card and refresh the user interface database 116 (act 350).

However, if the memory card detection circuitry 170 did not detect an insertion of a memory card into the slot 120 while the player 100 was powered down (e.g., the Q output is still low), the microprocessor 130 would know that the card in the slot 120 at power-up is the same card as the one that was in the slot 120 the last time the user interface database 116 was refreshed (i.e., when the Q output was last reset to zero). Since the microprocessor 130 knows no change could have been made to the digital media content on the card (since a card was not inserted into the player 100 during power-off, there wasn't an opportunity for another device to change the digital media content on the card), the microprocessor 130 can continue with the power-up procedure without refreshing the user interface database 116 (act 360). This would avoid the needless start-up delay that can frustrate a user and discourage him from using a removable memory card.

There are many alternatives that can be used with these embodiments. For example, instead of triggering a refresh of the user interface database 116 based on the detection of an insertion of a memory card while the player 100 was powered-down, a refresh of the user interface database 116 can be triggered by the detection of a removable memory card while the player 100 was powered-down. This alternative may be preferred in situations where the user interface database 116 does not have a field to distinguish between digital media content stored on a card and stored in internal memory 110. In these situations, a database refresh may be needed to avoid presenting the user with the option of playing digital media content that is no longer available to the digital media player 100. In yet another embodiment, instead of clearing the flip flop 175 upon a database refresh and later triggering a new refresh when the value of Q is high, the microprocessor 130 can store the state of the flip flop 175 when the database is refreshed and later compare the current state of the flip flop 175 with the stored state. A difference in the states would indicate that a card was removed and/or inserted into the card slot 120 and would trigger a database refresh.

It should be noted that, while the digital medial player 100 is powered-on, the microprocessor 130 can directly monitor the card slot 120 and trigger a refresh of the user interface database 116 based on whether an insert signal is provided to the microprocessor 130 by the card slot 120. However, the microprocessor 130 can also detect insertion of a card when powered-up by monitoring the Q output of the flip flop 175.

In the above embodiments, a database refresh was triggered by the insertion of a memory card into the card slot 120—either while the digital media player 100 was powered-down (as detected using the memory card insertion detection circuitry 170) or while the digital media player 100 was powered-up (as detected from the insert line from the card slot 120 or using the memory card insertion detection circuitry 170). In either situation, the removal of the memory card from the player 100 provided the possibility that the digital media content on the memory card was modified, and that possibility is the reason the user interface database 116 was refreshed. However, it is possible that the database refresh may be unnecessary because the digital media content on the card may not have changed when the card was outside of the player 100.

Figure 4:
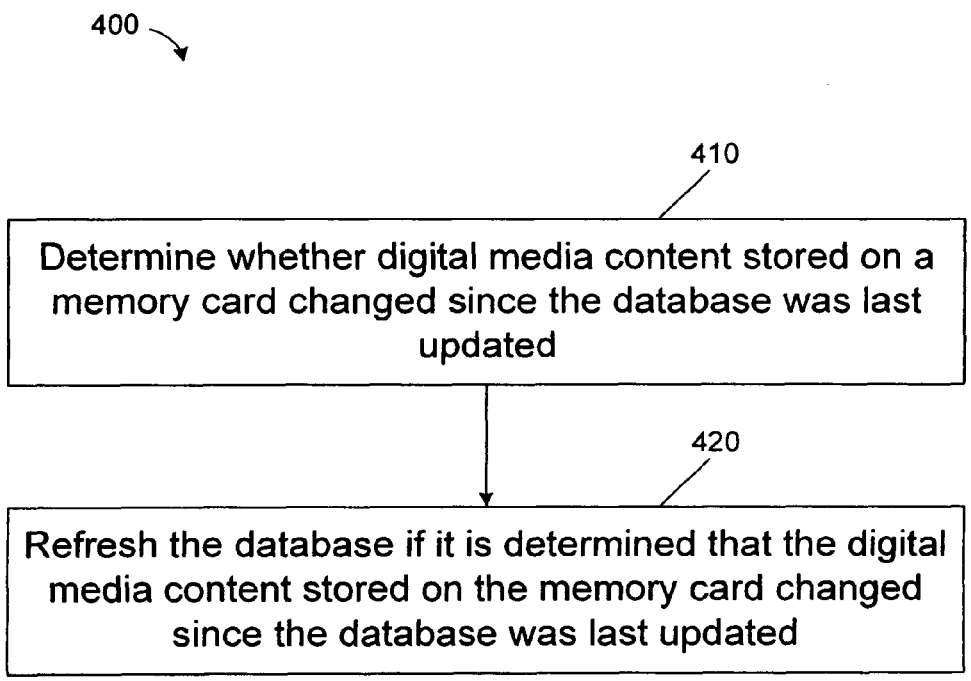
FIG. 4 is a flow chart illustrating a method of another embodiment for avoiding refreshing a database of metadata associated with digital media content.

To avoid a needless refresh of the user interface database 116 in such situations, the microprocessor 120 can implement the method shown in the flow chart 400 of FIG. 4. Specifically, the microprocessor 120 can determine whether digital media content stored on a memory card changed since the database was last updated (act 410) and refresh the database if it is determined that the digital media content stored on the memory card changed since the database was last updated (act 420). With this method, the microprocessor 130 avoids refreshing the database if digital media content on a memory card has not changed (or, put another way, if the digital media content on an inserted memory card is consistent with the user interface database 116 stored in the digital media player). This method can be used alone or in combination with the above-embodiments for removal/insertion detection of a memory card while the digital media player 100 was powered-down. Also, this method can be used during a power-up routine of the digital media player 100 and/or can be used when the digital media player 100 is already powered-up. This method can also be used when the digital media player 100 is connected to a device capable of modifying digital media content in the card to detect whether or not such a device actually modified digital media content. In this way, instead of automatic triggering of a refresh of the user interface database 116 after detecting a USB connection to a host device, the microprocessor 130 can determine whether the host device actually modified the digital media content.

Any suitable method can be used to determine whether digital media content stored on a memory card changed since the database was last updated. For example, a list of details of every digital media content file on the card can be stored in the internal memory 110 of the digital media player 100. A similar list can be created every time a card is inserted into the player 100 and compared with the stored list to determine if a database refresh is necessary. As the creation of such a list can be a relatively time-consuming process, the microprocessor 130 can use information from the file allocation table (FAT) of the memory card as a shortcut. For example, the microprocessor 130 can perform a check sum operation on the FAT table directory structure of the memory card at the time of building the user interface database 116 and store the check sum value in the memory 110 of the digital media player 100. On power-up, the microprocessor 130 can perform a new check sum calculation on the FAT table directory structure of the memory card inserted in the card slot 120 and compare the new check sum value with the check sum value stored in the memory 110. Since the values in the FAT table directory structure (and, therefore, the check sum value of the FAT table directory structure) are based on the contents of the memory card, the check sum value provides a number that is relatively unique to the contents on the memory card at the time the check sum was calculated. Plus, calculating a check sum value is much faster than generating a sufficiently-unique list of details of digital media content stored on a memory card, as the FAT table directory structure is relatively small. A match in check sum values would indicate that the digital media content on the card was not modified, and a database refresh can be avoided. In contrast, a mismatch in the check sum values would indicate that the digital media content in the card was modified, and a database refresh would be performed.

As another alternative, instead of comparing check sum values, the microprocessor 130 can compare one or more fields in the FAT table. Suitable FAT fields include the FSI_Free_Count field and the FSI_Nxt_Free field. The FSI_Free_Count field contains the last known free cluster count on the volume (i.e., it indicates how many clusters are free on the volume). The FSI_Nxt_Free field indicates the cluster number at which a driver should start looking for free clusters. These values, when unchanged from the time the user interface database 116 was updated, indicate a high probability that the digital media content on a memory card is also unchanged. Although comparing these fields is faster than calculating check sum values, the values in these fields may not be as unique as a check sum value, as a given cluster number can be obtained with multiple configurations. Accordingly, the use of these fields can result in more false positives/negatives than when using check sum values.

As discussed above, although just the user interface database 116 was refreshed in the above illustration, when a refresh operation occurs, both the user interface database 116 and the MTP database 118 (or just the MTP database 118) can be refreshed. There are several advantages for refreshing the MTP database 118 along with (or instead of) the user interface database 116. Before turning to those advantages, it should be noted that refreshing the MTP database 118 can be triggered by the detection of memory card insertion while the player 100 was powered down (e.g., by using memory card insertion detection circuitry 170), by the determination that digital media content stored on the removable memory device changed since the database was last updated, by detecting a USB data transfer, or by any other suitable technique. Accordingly, the embodiments described above that relate to the use of the memory card insertion detection circuitry 170 and the determination of whether digital media content changed (e.g., using a check sum value, etc.) can be, but do not have to be, used in combination with the following embodiments of refreshing the MTP database 118.

In some digital media players, the MTP database is altered only by the host device—not by the digital media player—and such altering occurs when the host modifies (e.g., adds, deletes, etc.) digital media content on the internal memory or the removable memory card of the player (although some players may be able to alter the MTP database when recordings are made by the player itself). There are several disadvantages to such an arrangement. For example, since the MTP database is stored on the player, the MTP database does not travel with the removable memory card. Accordingly, when the removable memory card is removed from a first player and inserted into a second player, a host connected to the second player will not be able to view (or organize, copy, etc.) the MTP-stored digital media content on the card because the MTP database that the host needs to view the content on the card is stored in the first player. One way to address this issue is to store a copy of the MTP database on the card, so the MTP database is portable with the card. However, this approach is vulnerable to MTP database corruption if a card is extracted during the writing of the MTP database to the card. In order to overcome these disadvantages, in this embodiment, the digital media player 100 updates the MTP database 118 when a new card is inserted in the player 100 and/or when digital media content in the card is modified (e.g., added, deleted, etc.). (As noted above, the digital media player 100 preferably, but not necessarily, also updates the user interface database 116.) With the MTP database 118 updated, a host device connected to the player 100 will be able to read digital media content stored on the card by a different host device.

In the above example, the MTP database 118 was updated with metadata of digital media content stored by another host device in MTP mode. It should be noted that the MTP database 118 can also be updated with metadata of non-MTP-stored digital media content (i.e., digital media content stored using MSC mode). In this way, the MTP database 118 would be updated with metadata for all digital media content—MTP-stored content and MSC-stored content—on the card. This avoids an interoperability problem encountered with some digital media players. When digital media content is loaded onto a removable memory card by an MSC card reader or when the player 100 is used as an MSC card reader on a non-MTP host device (e.g., an Apple Mac, a Linux system, an MTP device not operating in MTP mode, etc.), metadata for such content is not stored in the MTP database 118. Since MTP host devices can only see content whose metadata is stored in the MTP database 118, MSC-stored content in the card is invisible to MTP hosts. This makes managing digital media content using mixed systems difficult or impossible. By updating the MTP database 118 with metadata from both MTP-stored content and MSC-stored content, an MTP host will be able to view all content on the card, irrespective of whether it was stored using MTP.

As described above, a database can be refreshed in any suitable way. If a database allows entries associated with digital media content on a card to be marked differently from entries associated with digital media content on the internal memory 110 of the player 100, the player 100 can delete (or "flush") the external entries when a card is removed from the player 100 (since that content would no longer be available to be played). If that card is later re-inserted into the player 100, the player 100 can read the metadata from the content on the card and refresh the database. A problem can arise, however, with auxiliary information, such as album art and play list information. Such auxiliary information is typically stored by the host device in the internal memory 110 of the player 100 (not in the removable card), and pointers to the location of the information are stored in the database. When the external entries in a database are flushed, so too are the pointers and the stored auxiliary information. Accordingly, when the card is re-inserted into the player 100, the auxiliary information will not be available. A similar problem occurs when, instead of being re-inserted into the player 100, the card is inserted into a second player that does not have the auxiliary information (since it was originally stored in the player 100 and not in the second player). To address this issue, in this embodiment, a duplicate copy of the auxiliary data is stored in the memory card, thereby making the auxiliary data portable with the card. In this way, when the card is inserted into the second player, the second player will add to its MTP database both the metadata and the auxiliary data read from the card. Because only a copy of the auxiliary data is stored in the card (and not a duplicate copy of the MTP database), the possibility of database corruption noted above is avoided.

Figure 5:
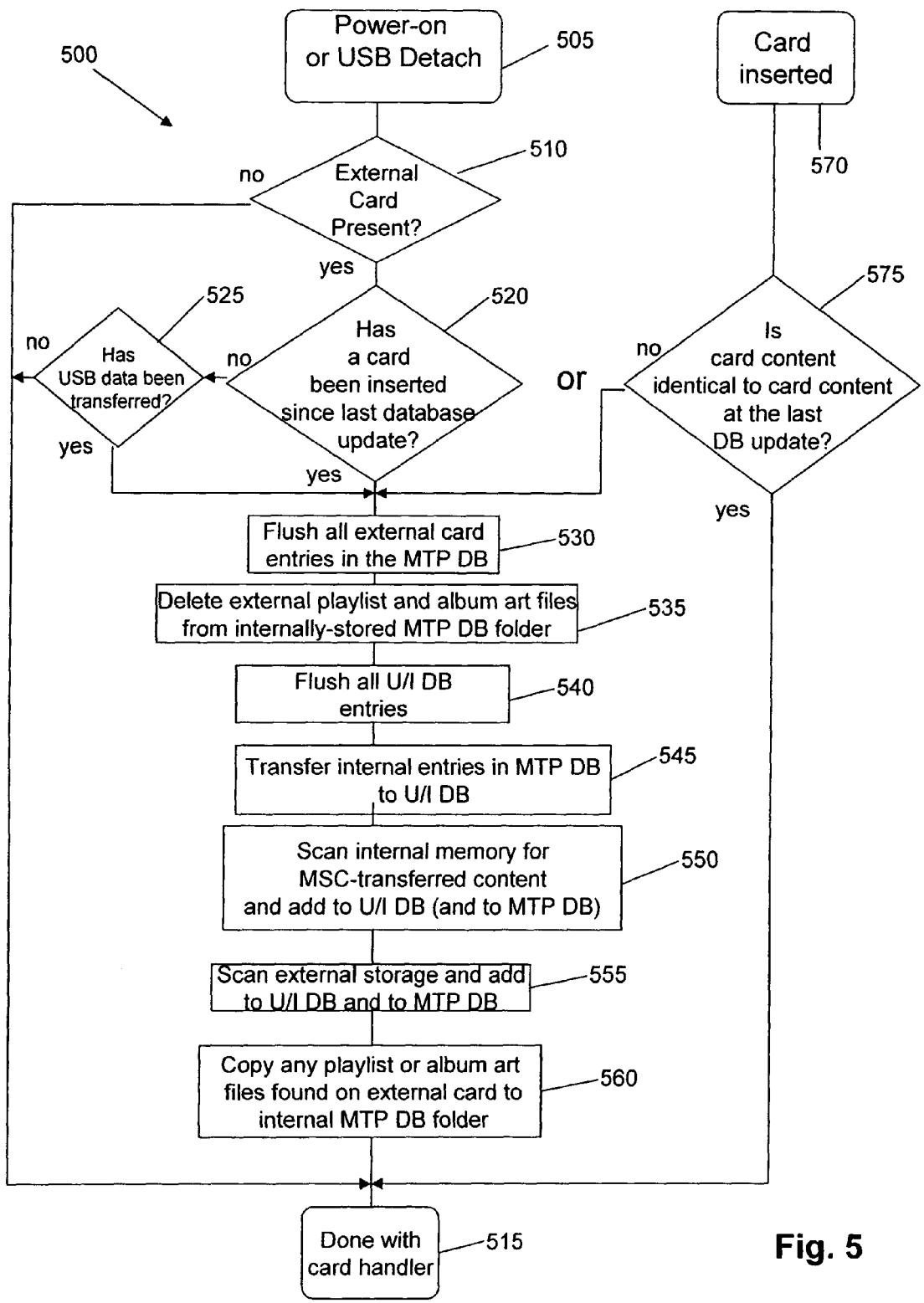
FIG. 5 is a flow chart illustrating a method of an embodiment for improving the experience of a digital media player using a removable memory device.

As described above, each of the embodiments described herein can be used alone or in combination. FIG. 5 presents a flow chart 500 of an embodiment illustrating how each of these embodiments can be used together. Turning now to FIG. 5, when the player 100 is powered-on or when a USB cable attaching the player 100 to a host device is detached (act 505), the microprocessor 130 performs a card handler routine. First, a determination is made whether an external memory card is present (act 510). If an external memory card is not present, the card handler's operations are complete (act 515). However, if an external memory card is present, a determination is made regarding whether the card was inserted since the last database update (act 520). This determination can be made, for example, using the memory card insertion detection circuitry 170 described above (although other detection techniques can be used). If a card has not been inserted since the last database update, a determination is made regarding whether USB data was transferred (act 525). If USB data was transferred while the player 100 was connected to a host device, it is possible that the contents in the external card changed and, therefore, that the database would be out of date. If no USB data was transferred, the card handler's operations are complete (act 515). Otherwise, if the answer to determination 520 or 525 is yes, the external card entries in the MTP database 118 are flushed (act 530), and the external play list and album art files from an internally-stored MTP database folder are deleted (act 530). Although both play list and album art are used in this example as auxiliary information, it should be noted that just play list information or just album art can be used. Also, other forms of auxiliary information can be used.

Next, internal entries in the MTP database 118 are transferred to the user interface database 116 (act 545). The internal storage (or memory) 110 is then scanned for MSC-transferred content and added to the user interface database 116 (and, optionally, to the MTP database 118) (act 550). Then, the external memory card (storage) is scanned, and entries are added to the user interface database 116 and the MTP database 118 (act 555). Finally, any play list or album art files found on the external card are copied to the internal MTP database folder (act 560).

The above process was performed when the player 100 was powered-up or detached from a USB connection to a host device. If, instead, a memory card was inserted into the player 100 while the player 100 was powered-up (act 570), a determination is made regarding whether the content in the card is identical to the content at the last database update (act 575). This determination can be made, for example, using any of the techniques described above. If the card content is the same, the card handler's operations are complete (act 515). Otherwise, acts 530-560 are performed.

Some of the following claims may state that a component is operative to perform a certain function or configured for a certain task. It should be noted that these are not restrictive limitations. It should also be noted that the acts recited in the claims can be performed in any order—not necessarily in the order in which they are recited.

It is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A method for avoiding refreshing a database of metadata associated with digital media content, the method comprising:

performing the following during power up of a digital media player, wherein a memory device is connected to the digital media player at power up, and wherein the digital media player stores a database of metadata associated with digital media content:

(a) determining from a latch in the digital media player whether the memory device was connected to the digital media player while the digital media player was powered down, wherein a battery powers the latch when the digital media player is powered down, wherein a clock of the latch is connected to a memory device slot of the digital media player, and wherein insertion of the memory device into the memory device slot while the digital media player was powered down causes a different state to be set in the latch because of a change in input to the clock, whereas removal of the memory device from the memory device slot does not reset the latch; and (b) refreshing the database only if it is determined that the memory device was connected to the digital media player while the digital media player was powered down as opposed to before the digital media player was powered down, refreshing the database.

2. The method of claim 1, wherein the latch comprises a D flip-flop.

3. The method of claim 1, wherein the database comprises a user interface database.

4. The method of claim 3, wherein the digital media player further stores a media transfer protocol database.

5. The method of claim 4, wherein (b) comprises refreshing the user interface database but not the media transfer protocol database.

6. The method of claim 4, wherein (b) comprises refreshing both the user interface database and the media transfer protocol database.

* * * * *